(12) United States Patent
Acton et al.

(10) Patent No.: US 6,881,231 B2
(45) Date of Patent: Apr. 19, 2005

(54) REDUCTION IN MINERAL SALT DEPOSITION

(75) Inventors: Elizabeth Acton, Cambridge (GB); George John Morris, Cambridge (GB)

(73) Assignees: BP Exploration Operating Company Limited, London (GB); Asymptote Limited, Cambridge (GB)

( * ) Notice: Subject to any disclaimer, the term of this patent is extended or adjusted under 35 U.S.C. 154(b) by 0 days.

(21) Appl. No.: 10/014,795

(22) Filed: Dec. 14, 2001

(65) Prior Publication Data

US 2002/0131923 A1 Sep. 19, 2002

Related U.S. Application Data

(63) Continuation of application No. PCT/GB00/02368.

(30) Foreign Application Priority Data

Jun. 22, 1999 (GB) .............................. 9914398

(51) Int. Cl.[7] ................................. C02F 5/00
(52) U.S. Cl. ............................ 23/301; 23/300; 23/304; 203/7; 423/DIG. 8; 252/175; 210/696; 210/702; 210/714
(58) Field of Search ...................... 23/301, 300, 302 R, 23/304; 203/7; 422/13; 423/DIG. 8, 430; 210/696, 702, 714; 252/175, 387; 204/157.42

(56) References Cited

U.S. PATENT DOCUMENTS

| 3,510,266 | A | * | 5/1970 | Midler, Jr. .................. 23/273 |
| 3,891,394 | A | | 6/1975 | Smith et al. |
| 3,892,539 | A | * | 7/1975 | Midler, Jr. .................... 23/296 |
| 3,996,018 | A | | 12/1976 | Midler, Jr. |
| 4,004,886 | A | * | 1/1977 | Thijssen et al. .............. 23/301 |
| 4,159,194 | A | * | 6/1979 | Steward ....................... 23/301 |
| 5,966,966 | A | * | 10/1999 | Botsaris et al. ............. 210/748 |
| 6,302,958 | B1 | * | 10/2001 | Lindrud et al. ............... 23/301 |
| 6,315,966 | B1 | * | 11/2001 | Baumgard et al. .......... 117/200 |
| 6,355,214 | B1 | * | 3/2002 | Fader et al. .................. 422/13 |

FOREIGN PATENT DOCUMENTS

| EP | 0 916 622 A1 | 5/1999 |
| GB | 597068 | 1/1948 |
| WO | 93/24199 | 12/1993 |
| WO | 95/02745 | 1/1995 |
| WO | 95/09292 | 4/1995 |

OTHER PUBLICATIONS

Gatumel et al. "Nucleation Control in Precipitation Processes by Ultrasound", 1998, Kona, No. 16, pp. 160–168.*

* cited by examiner

Primary Examiner—Stanley S. Silverman
Assistant Examiner—Peter J Lish
(74) Attorney, Agent, or Firm—Nixon & Vanderhye

(57) ABSTRACT

A composition for reducing deposition of a mineral salt from an aqueous supersaturated solution onto a solid surface in contact with the aqueous supersaturated solution which composition comprises a dispersion of either (i) seed crystals of the mineral salt in an aqueous solution of the mineral salt or (ii) seed crystals of a salt isomorphous with the mineral salt in an aqueous solution of the isomorphous salt wherein the dispersed seed crystals are of Mean particle size of less than 2.5 microns.

17 Claims, 8 Drawing Sheets

REDUCTION IN MINERAL SALT DEPOSITION

This application is a continuation of Application No. PCT/GB00/02368, filed 19 Jun. 2000, the entire content of which is hereby incorporated by reference in this application.

This invention relates to methods of reducing deposition of mineral salts, in particular, from aqueous supersaturated solutions, and especially concerns reducing scaling.

BACKGROUND OF THE INVENTION

Water often contains inorganic salts, in particular those of calcium and/or barium which may be of sparing solubility in water and tend to deposit on the inside walls of pipes, and in valves and tanks and on heat exchangers as scale. If scale is allowed to build up in a system, it causes increased pressure losses, reduction in flow rate in pipes or heat exchange capacity and ultimately pipe blockage. Scaling of equipment may arise, for example, in the petrochemical industry, in power generation, and in paper pulp manufacture.

In the production of hydrocarbons from subterranean formations the deposition of scale such as barium or strontium sulphate, calcium carbonate, calcium sulphate or calcium fluoride on surfaces and production equipment is a major production problem. Scale build-up reduces well productivity and shortens the lifetime of production equipment.

In paper pulp manufacture, calcium and barium salts are eluted from wood pulp into the process water. Both aluminium sulphate and sulphuric acid are used in paper making processes and sulphate ions combine with calcium and barium ions to form barium sulphate and calcium sulphate respectively, which are sparingly soluble in water and tend to deposit as scale on surfaces of the processing equipment, including rollers.

Traditionally scaling problems have been overcome by addition of scale inhibitors, which are organic compounds which complex at least some of the metals. But these are expensive and contaminate the water.

According to "Inhibition of calcium sulfate scale by a fluidised bed", J A M Meijer (Section 2.2.), physical scale prevention methods are known. All physical methods only aim at the prevention of scale deposition on the walls of the system, while crystallisation in the bulk of the solution is allowed and sometimes even stimulated. The most effective physical method is said to be the seeding technique. This technique is based on the addition of seed crystals having a large total surface area, which are able to compete with the walls of the system in consuming the supersaturation. The seeds mostly consist of the same material as the mineral scalant, but other materials are also permitted as long as their surface is favourable for crystallisation. In those cases where the mineral scale is able to crystallise in various modifications the seeding technique yields the best results if the better soluble, faster growing modification is allowed to deposit on the seeds. This condition is inverted in the chemical methods, where the slower growing modification is desired.

An example of the seeding technique is provided in U.S. Pat. No. 3,891,394 which relates to a method and apparatus for the reduction of scale formation in fluid handling equipment, particularly in the tubing and hardware employed in pumping equipment (for example, in the petroleum industry). The apparatus is in the form of a specially shaped hollow core through which the pumped fluid flows, an appreciable part of the mineral content of the fluid being thereby caused to enter a crystalline form while remaining suspended in the fluid to be carried through the pump. The core is fabricated from a special formula of a number of metals by means of a process which encourages the formation of a large number of alloys. The specific alloys incorporated in the core material are chosen in a deliberate attempt to simulate the crystal shapes of the important minerals contained in the fluids to be handled by the pump in which the crystal generator is to be installed. As the fluid enters the crystal generator there is a sudden pressure drop accompanied by a sudden increase in flow velocity and a high degree of turbulence. The contact of the dissolved mineral molecules with the alloy crystal encourages the initial formation of the mineral crystal with the alloy crystal having the effect of a "seed" crystal. The abrupt disturbance afforded by the sudden drop in pressure with the accompanying increase in velocity and the turbulence of the fluid within the core also aids the initial crystal formation. As the initial crystals are formed on the alloy surfaces they are immediately washed away by the violent action of the fluid before additional crystals may grow around the initial crystal and before such a growing crystal can attach itself permanently to the alloy surface. As the initial crystal is torn away from the alloy surface the turbulence of the fluid produces a high degree of exposure of the crystal with additional mineral molecules of the same type so that the freed and suspended initial crystal rapidly grows as it passes though the core and upward into the tubing. The crystals leave the crystal generator in the form of a suspended "snow" which continues to serve as a constant supply of "seed" crystals around which further crystallisation can occur as the fluid flows upward to surface equipment. U.S. Pat. No. 3,891,394 is silent regarding the size of the generated "seed" crystals.

A further example of the seeding technique is given in EP-A-0916622 which relates to a process for preventing scale formation in a paper-making process which comprises adding crystals as seed for crystallisation which have the same or similar form to a scale substance formed in the paper-making process, thus encouraging the scale-forming components to precipitate onto the crystal surfaces. The scales may be calcium sulfate, barium sulfate or calcium oxalate. It is preferable that the seed crystal has an average diameter of 0.05 to 100 $\mu$m, more preferably 5 to 50 $\mu$m.

Another physical method is said to be ultrasonic treatment (see "Inhibition of calcium sulfate scale by a fluidised bed", J A M Meijer, Section 2.2), which causes an erosion of the developing scale layer on the wall. The so-formed particles can further act as seed crystals. Since this method is said to be only feasible for small systems, its application is limited. Ultrasonic energy has also been applied to heat exchangers to remove scale and in well bores of oil wells (see e.g. I. A. Beresnev and P. A. Johnson, Geophysics, Vol. 59 No. 6, June 1994 pp 1000–1017).

SUMMARY OF THE INVENTION

It has now been found that scale control is particularly effective where the Mean particle size of the seed crystals is less than 2.5 microns ($\mu$m). Such seed crystals can be prepared using a process which is economic in energy on a large scale.

The present invention provides a composition for reducing deposition of a mineral salt from an aqueous supersaturated solution onto a solid surface in contact with the aqueous supersaturated solution which composition comprises a dispersion of either (i) seed crystals of the mineral salt in an aqueous solution of the mineral salt or (ii) seed crystals of a salt isomorphous with the mineral salt in an aqueous solution of the isomorphous salt wherein the dispersion has seed crystals of Mean particle size of less than 2.5 microns.

The present invention also provides a method of reducing deposition of mineral salts from an aqueous supersaturated solution onto a solid surface in contact with the aqueous supersaturated solution which method comprises:

(a) forming a composition comprising a dispersion of either (i) seed crystals of the mineral salt in an aqueous solution of the mineral salt or (ii) seed crystals of a salt isomorphous with the mineral salt in an aqueous solution of the isomorphous salt, the seed crystals of the dispersion having a Mean particle size of less than 2.5 microns;

(b) distributing said composition into either (i) an aqueous supersaturated solution of the mineral salt or (ii) an aqueous precursor liquid of the aqueous supersaturated solution which aqueous precursor liquid is saturated with respect to the seeds, and in the case of (b)(ii) converting the aqueous precursor liquid into an aqueous supersaturated solution of the mineral salt; and (c) contacting the treated aqueous supersaturated solution with the solid surface.

Without wishing to be bound by any theory, it is believed that the reduction in deposition of mineral salts from a treated aqueous supersaturated solution onto a solid surface is due to controlled precipitation of the mineral salts onto the seed crystals. The seed crystals act by:

(i) reducing the average crystal size of the mineral salt which crystallises out of the aqueous supersaturated solution so that the crystals are less likely to cause blockages; and (ii) accelerating the rate at which the mineral salt precipitates out of the aqueous supersaturated solution i.e. the solution is supersaturated for a shorter period of time.

The contact time between the solid surface and the aqueous supersaturated solution is thereby reduced and consequently the mineral salt is less likely to add to crystals which have formed on the solid surface.

The mineral salts which would otherwise be deposited may be, for example, scaling salts, such as the carbonates and/or sulphates of alkaline earth metals, such as calcium, strontium, barium, or magnesium carbonate.

The seed crystals may be in a saturated aqueous solution, which may contain up to 3000 ppm of the mineral salt in question, such as, 100 up to 2000 ppm for barium sulphate and 20 up to 700 ppm for calcium carbonate. Alternatively, the seed crystals may be in an aqueous solution which is below the thermodynamic solubility limit of the mineral salt.

Preferably, the seed crystals are of Mean particle size 0.1–2.5 microns, in particular 0.5–2 microns, more preferably 0.5–1.5 microns. The crystals should have at least 2 dimensions within these ranges.

Typically, the seed crystals have 0.01–0.8 times, preferably 0.025–0.5 times, more preferably 0.05–0.35 times, most preferably 0.05 to 0.2 times the average diameter of crystals of the same mineral salt, which have been allowed to crystallise out from an aqueous supersaturated solution thereof on standing and without any outside influences apart from gravity and time.

The seed crystals have no live growing surfaces and therefore in their dispersion in the saturated aqueous solution will not grow bigger on standing other than by Ostwald ripening in which small particles dissolve and large particles grow. However they are is still capable of growing if placed in an aqueous supersaturated solution.

The seed crystals are usually of the same mineral salt whose deposition on the surface is to be altered, but may be of a salt isomorphous therewith; thus for example calcium or magnesium carbonate seeds may be used to alter the deposition of strontium carbonate.

The form of the seed crystals may also be different in crystal morphology or habit from those which would otherwise naturally form from the aqueous supersaturated solution. Thus where the deposited mineral salt can exist in 2 or more crystalline forms, which differ in morphology i.e. the compound is polymorphic, and the form naturally deposited from the aqueous supersaturated solution is of one form, then the seed crystals should preferably be in a different crystalline form. The seed crystals are preferably of the more thermodynamically stable polymorph. Thus calcium carbonate has 3 crystalline forms, of which calcite is deposited slowly from aqueous supersaturated solution, but aragonite is deposited rapidly; in this case the seed crystals used should preferably be of the latter form. In the case of barium sulphate, as explained below, the slowly made normal form is generally star shaped e.g. with 8 point rosettes (with one dimension thickness less than 0.4 times of each of the other dimensions) or distorted rhomboid, while the rapidly made form is rectangular, oval or undistorted rhomboid, usually with voids, with one of its 3 dimensions of a length 0.4–1.5 times that of the other dimensions, especially with the dimensions in the ratio 1–1.5:1:0.4–0.8. More details are provided hereinafter in respect of barium sulphate.

The seed crystals may be made separately from the solution in which they are dispersed, so they may be made, isolated from their production medium, and then dispersed in the solution. Preferably they are made in that solution and used as such as the dispersion, or the dispersion produced may be concentrated—e.g. by centrifuging or via a cyclone to increase the insoluble mineral salts content of the dispersion. The seed crystals are usually present in the dispersion in weight amounts of 1–60%, e.g. 10–40% (based on the total weight of dispersion).

It is envisaged that the dispersion may comprise a mixture of seed crystals of the mineral salt and seed crystals of a salt isomorphous with the mineral salt.

The seed crystals may be obtained via physical disturbance of an aqueous supersaturated solution before significant nucleation (initiation of crystallisation) starts. In the case of solutions in which nucleation proceeds fast (e.g. scaling solutions), the disturbance is usually at the location of its production Thus, when an aqueous supersaturated solution is made by mixing solutions of 2 or more components or ingredients, then the disturbance is usually at or near the location of mixing. The disturbance may be to one or more of the solutions which are to be mixed provided that the disturbance is near the location of mixing.

The physical disturbance may be generated in many different ways, for example by mechanical vibration or stirring, oscillation or rotation, enhancement of natural convection, electric fields, magnetic or electromagnetic stirring, detonation and shock waves, vortices (however produced), agitating with gas bubbles, release of pressure, etc. Generation of cavitation in the aqueous solution is preferred. This cavitation may also be achieved using hydrodynamic means such as a propeller or lifting surface so as to create vortices in the liquid. The preferred form of the disturbance is sonic or ultrasonic vibration, most preferably ultrasonic.

Thus, in a preferred embodiment of the present invention there is provided a composition for reducing deposition of a mineral salt from an aqueous supersaturated solution onto a solid surface in contact with the aqueous supersaturated solution which composition comprises a dispersion of either (i) seed crystals of the mineral salt in an aqueous solution of the mineral salt or (ii) seed crystals of a salt isomorphous with the mineral salt in an aqueous solution of the isomorphous salt wherein the seed crystals of the dispersion have a Mean particle size of less than 2.5 microns and are obtainable by subjecting an aqueous supersaturated solution of either (i) the mineral salt or (ii) a salt isomorphous with the mineral salt to sonic or ultrasonic vibration.

In yet a further embodiment of the present invention there is provided a method of reducing deposition of mineral salts from an aqueous supersaturated solution onto a solid surface in contact with the aqueous supersaturated solution which method comprises:

(a) forming a composition comprising a dispersion of either (i) seed crystals of the mineral salt in an aqueous solution of the mineral salt or (ii) seed crystals of a salt isomorphous with the mineral salt in an aqueous solution of the isomorphous salt wherein the seed crystals of the dispersion have a Mean particle size of less than 2.5 microns by subjecting an aqueous supersaturated solution of either (i) the mineral salt or (ii) a salt isomorphous with the mineral salt to sonic or ultrasonic vibration;

(b) distributing said composition into either (i) an aqueous supersaturated solution of the mineral salt or (ii) an aqueous precursor liquid of the aqueous supersaturated solution which aqueous precursor liquid is saturated with respect to the seeds, and in the case of (b)(ii) converting the aqueous precursor liquid into an aqueous supersaturated solution of the mineral salt; and (c) contacting the treated aqueous supersaturated solution with the solid surface.

Without wishing to be bound by any theory, it is believed that by subjecting the aqueous supersaturated solution to sonic or ultrasonic vibration that the rate of crystallisation is increased. It is also believed that the Mean particle size of the seed crystals decreases with increasing crystallisation rate. Generally, the rate of crystallisation of the seed crystals from the aqueous supersaturated solution of either (i) the mineral salt or (ii) the salt isomorphous with the mineral salt is 2 times faster, more preferably 4 times faster than in the absence of sonic or ultrasonic vibration.

Ultrasound may be applied to the solution as soon as physical conditions allow it to become supersaturated (or supercooled), and preferably before any spontaneous nucleation may occur. Preferably, ultrasound is applied to the supersaturated (or supercooled solution) until the supersaturation level is either reduced to saturation level or to below the thermodynamic solubility limit of (i) the mineral salt or (ii) the salt isomorphous with the mineral salt. If desired more than one method of effecting the disturbance may be used, especially ultrasonic vibration and a mechanical method e.g. hydrodynamic or mechanical agitation.

Small bubbles of a vapour phase or dissolved gas form out of a liquid as a wave of physical disturbance passes through the solution. These bubbles collapse after the wave has passed, causing a large pressure change which in turn induces nucleation in the liquid.

The preferred frequency of the ultrasound is 16–100 kH. Above 100 kHz little nucleation can be obtained except at extremely high power. The particularly preferred frequency is between 16 and 40 kHz. Energy densities of 0.1–1000 J/cm$^3$, for example 1–100 J/cm$^3$ are preferred, especially at the latter frequencies. The duration of applied ultrasound is usually 0.01–360 seconds. The application of ultrasound to a supersaturated (or supercooled) aqueous solution can result in the formation of many nucleation sites, resulting in the small crystals of the invention. In aqueous liquids where crystals exist, either formed 'spontaneously' or by applied physical disturbance, new crystals may be formed by fragmentation either due to cavitation or other effects induced by the ultrasound, such as acoustic streaming. This phenomenon is referred to as grain refinement or grain multiplication. Crystals formed in an ultrasonic field may also be found to have different surface properties (charge etc.) which modify their subsequent adhesion properties as described below with respect to barium sulphate.

For many applications the use of ultrasound will modify simultaneously both nucleation and crystal growth. However, these two phenomena may be controlled independently in the invention by applying the disturbance at appropriate different stages of the precipitation process, especially from supercooled solutions from which mineral salt deposits slowly. Generally, the ultrasound may be applied to the solution either before or during the solidification process or following storage.

Ultrasonic vibrations may be generated by a convenient means, in particular using electromagnetic, piezoelectric, electrostrictive or magnetostrictive devices, piezo electric ones giving low power per unit volume of solution contacted and acoustic horns giving high power per unit volume. The ultrasonic power and frequency required will, in part, be determined by the viscosity, temperature, pressure, presence of solids, immiscible liquids and gas bubbles, dissolved gas content etc. of the fluid to be treated. For example, typical downhole conditions include temperatures of up to 200° C. and pressures of from 200 to 600 bar while typical conditions in top-side equipment include temperatures of from ambient to 100° C. and pressures of from 0.1 to 70 bar, for example 1 to 10 bar. In general, the desired ultrasonic conditions are those which result in cavitation in the bulk supercooled or supersaturated aqueous liquid to induce nucleation or to cause grain refinement. High intensity ultrasound may be generated most readily at the lower ultrasound frequencies, such as 20 kHz.

The efficiency of nucleation in a fluid will be dependent on the extent of supersaturation or supercooling, and the density and distribution of the cavitation sites within the fluid. The degree of supersaturation over the saturation level maybe 1.1–1000 e.g. 20–500, preferably 50–400 times over that level.

The sources of ultrasound may be coupled directly to the solution but may also be connected indirectly via coupling mechanisms such as horns, waveguides and/or through the walls of the container holding the liquid, or walls of the pipe line through which it passes.

In a preferred process for making the seed crystals an aqueous supersaturated solution e.g. of mineral salts such as barium or calcium carbonate or sulphate is produced by passing 2 or more aqueous solutions of the separate components e.g. barium or calcium chloride and sodium sulphate or carbonate to a locus of mixing, at which the aqueous supersaturated solution is made in situ and the physical disturbance e.g. ultrasonic treatment is applied. There results small seed crystals of the mineral salt (Mean particle size of less than 2.5 microns) and after sufficient time e.g. 0.1–10 secs, the crystals grow until the supersaturation level is either reduced to saturation level in which case a suspension of seed crystals in an saturated aqueous solution is made or to below the thermodynamic solubility limit of the mineral salt in which case a suspension of seed crystals in a solution of the mineral salt is made. Preferably, the physical disturbance e.g. ultrasonic treatment may be applied throughout this time to the aqueous supersaturated solution until the desired suspension is made, but may be applied only to the locus of mixing and then the seed crystals allowed to grow to reduce the degree of supersaturation. The amount of crystals of the mineral salt produced is usually 1–60% w/w of the total weight of crystals and solution produced at the locus of mixing.

It is envisaged that the ratios of the aqueous solutions of the separate components of the seed crystals which are passed to the location of mixing may be selected so as to: (a) attain a maximum mass of seed crystals, (b) minimise the size of the seed crystals, or (c) obtain seed crystals of a desired crystal morphology. Thus, where two aqueous solutions of the separate components are passed to the location of mixing, the ratio of the first aqueous solution to the second aqueous solution may be in the range of 1:9 to 1:1 by volume, preferably 1:7 to 1:3 by volume.

In order to increase the contact time for the turbulence to take effect to produce a dispersion of seed crystals, the flow rate of the aqueous supersaturated solution passing under the influence of the turbulence may be reduced e.g. to give a power per unit volume of solution treated per sec of 0.1–1 W per $cm^3$ per second. The flow rate may be less than that of the source of the aqueous supersaturated solution (or aqueous precursor liquid and complementary ion liquid). Thus to reduce the flow rate, the diameter of the input line may be reduced or an impeller may be present in the line to slow liquid flow down and ideally to transmit the power gained to one or both of an agitator at the location of seed crystal generation and a propeller for use in a pump to accelerate the flow rate of the product suspension of seed crystals for mixing with the aqueous supersaturated solution or aqueous precursor liquid.

The dispersion of seed crystals is then mixed with the aqueous supersaturated solution or aqueous precursor liquid. Preferably, the mixing is with an aqueous precursor liquid containing at least one of the salt ions, which aqueous precursor liquid is saturated with respect of the seeds; thus the seed suspension of barium sulphate may be added to an aqueous solution comprising barium chloride (or sodium sulphate) saturated in barium sulphate e.g. high barium formation water or sea water respectively. The aqueous precursor liquid (with suspension) may then be altered to produce the aqueous supersaturated solution, e.g. by change of temperature (for calcium carbonate), pressure (for calcium carbonate) or mixing with an aqueous solution comprising the complementary ions e.g. sea water containing sodium sulphate (or formation water comprising barium chloride respectively). If desired the dispersion of seed crystals may be co-mixed with both the aqueous precursor liquid and the aqueous solution with complementary ions.

The dispersion of seed crystals is mixed with the aqueous supersaturated solution under conditions of turbulence e.g. with a Reynolds Number of at least 2000 e.g. 3000–4000 while the mixing with aqueous precursor liquid may or may not be under turbulent conditions. The mixing may be achieved with mixers, with or without moving parts. The former include mixers with paddle wheel or other stirrers, while the latter include jet and venturi mixers and other devices in which a small stream of fluid (here dispersion) is passed into a flowing stream of a second fluid at or upstream of a point of maximum turbulence.

The percentage weight of seed crystals from the dispersion to total weight of seed crystals and depositable mineral salts in the aqueous supersaturated solution is generally in the range 1–75% w/w e.g. 5–60% w/w, more preferably 5–50% w/w. The depositable mineral salts are those which would otherwise deposit downstream of the mixing zone in the absence of the seeds i.e. relates to the degree of supersaturation.

In the case where the seed dispersion is mixed with an aqueous precursor liquid prior to addition of a second component resulting in deposition e.g. in the case of mineral salts, which crystallise fast from an aqueous supersaturated solution such as barium sulphate or calcium carbonate, the percentage weight of seed crystals to the total weight of seed crystals and depositable mineral salts is usually as given above.

If desired, especially when the relative weight of the dispersion to the total weight of aqueous supersaturated solution that has to be converted to a saturated aqueous solution (e.g. to be stopped from causing scaling, is low (e.g. 5–20%), the mixing of the seed dispersion and the aqueous supersaturated solution (or aqueous precursor liquid) may be performed at least twice e.g. 2–4 times with at each stage the above volumes of seed dispersion to total volume of dispersion and aqueous supersaturated solution. Thus a 40% w/w seed dispersion may be added in a 1:3 weight ratio to the aqueous supersaturated solution (or aqueous precursor liquid, prior to effecting supersaturation) to produce a second dispersion of 5–20% w/w crystals in a saturated aqueous solution; this second dispersion, preferably after concentration to 30–50% mineral salts, may then be mixed with fresh aqueous supersaturated solution or aqueous precursor liquid as described and a third dispersion in saturated aqueous solution produced. This process can be repeated several times, until all the original aqueous supersaturated solution or aqueous precursor liquid has been treated. In each stage the product is a dispersion of crystals in a saturated aqueous solution, before addition of more aqueous supersaturated solution or aqueous precursor liquid.

If desired, the dispersion of crystals may be divided and the divided dispersion used to treat separate portions of the aqueous supersaturated solution or aqueous precursor liquid. Thus the multi step mixing of the seed dispersion and the aqueous supersaturated solution or aqueous precursor liquid (prior to effecting supersaturation) may be performed in steps in series or in parallel or a combination of both.

In its simplest form, particularly with mineral salts that crystallise slowly, the seed dispersion is mixed with the aqueous supersaturated solution to effect crystallisation to produce a dispersion of mineral salt in saturated aqueous solution. When the seed dispersion is mixed with aqueous precursor liquid, then, after mixing, the physical or chemical conditions may be changed to generate the aqueous supersaturated solution at least incipiently and then the crystallisation may start. Thus the physical condition changed may be temperature (e.g cooling) or pressure (e.g. reduction) while the chemical conditions may be addition of a precipitating component, e.g. a complementary ion e.g. sulphate ion for mineral salts, or non solvent.

After the mixing of the seed dispersion and the aqueous supersaturated solution, crystallization is allowed to occur eventually to produce a slurry of crystals in a saturated aqueous solution with reduced deposition on walls of solid surfaces in contact therewith. It is believed that the form of crystals produced is of different adhesive properties to those made without the influences of the physical disturbance and that the contact time between the aqueous supersaturated solution and the solid surface in contact therewith is reduced.

The present invention also provides an apparatus for effecting controlled mineral salt deposition, which comprises:

a crystal seed generator chamber, having an inlet for an aqueous supersaturated solution or a first inlet for a first aqueous precursor liquid of the aqueous supersaturated solution and a second inlet for a second aqueous precursor liquid of the aqueous supersaturated solution, a means for creating turbulence e.g. cavitation in a solution in said chamber to effect crystallisation, and an outlet for a dispersion of seed crystals.

The crystal seed generator chamber may have a plurality of means for creating turbulence each of the means acting on different zones of the chamber. Alternatively, the apparatus may contain a number of crystal seed generator chambers connected in series, for example 2–4, preferably 2–3 crystal seed generator chambers. It is also envisaged that a number of crystal seed generator chambers may be connected in parallel, for example 2–10, preferably 3–5. Optionally each of the crystal seed generator chambers which are connected in parallel (first crystal seed generator chambers) are connected to a further crystal seed generator chamber (second crystal seed generator chamber) which is capable of handling the flows from each of the first crystal seed generator chambers. Thus, crystal seed generation may be initiated in the first crystal seed generator chambers and may be substantially completed in the optional second crystal seed generator chamber. An advantage of using an apparatus having a plurality of crystal seed generator chambers in parallel to generate a dispersion of seed crystals is that there is built in redundancy. In the event of a failure of a component in one of the crystal seed generator chambers, or during servicing of the apparatus, the flow of the first and second precursor liquids can be stopped in the part of the apparatus where the failed component is situated or the part of the apparatus which is to be serviced.

Suitably, the dispersion of seed crystals which is generated in the crystal seed generator chamber(s) is passed via a line to a mixing chamber having a first inlet for said dispersion, a second inlet for an aqueous supersaturated solution or aqueous precursor liquid thereof, a mixing means, and an outlet. When the second inlet is for an aqueous supersaturated solution of a mineral salt the outlet from the mixing chamber is for a dispersion of seed crystals in a solution of the mineral salt. When the second inlet is for aqueous precursor liquid, the apparatus also, preferably provides means for effecting a change in physical or chemical condition of the blend of aqueous precursor liquid and seed dispersion, said means being applied to said mixing chamber, or to a further chamber attached by a line to said outlet from said mixing chamber. Said means may comprise a cooling means e.g. a heat exchanger, or pressure reduction means e.g. a valve, or an inlet for a precipitating component e.g. complementary ion. Said means may also be located upstream of the mixing chamber to deliver an aqueous supersaturated solution to it e.g. in a line joined to said second inlet to the mixing chamber.

The aqueous supersaturated solution, which is to be treated in the process of the invention, may be divided into a small stream (e.g. 1–20% such as 5–10% of the total volume) and a remaining stream, the small stream being submitted to the turbulence e.g. cavitation treatment to produce the seed dispersion, which dispersion is then re-mixed with the remaining stream (in one or more steps). Thus, the apparatus can comprise a first line for the aqueous supersaturated solution, at least one side line therefrom forming a loop from the first line and returning thereto at a second chamber, a first chamber spacing said side line and comprising means for creating turbulence e.g. cavitation in the contents of said side line (i.e. of the loop) and said second chamber comprising mixing means.

When the seed dispersion is to treat an aqueous precursor liquid containing one component of a depositable mineral salt especially a rapidly depositing one, prior to or simultaneously with addition of at least one other component, to form the combination of first and other components, the apparatus preferably comprises a first line for a solution of said first component (e.g. an alkaline earth metal) saturated with the depositable mineral salt (e.g. an alkaline earth metal carbonate or sulphate), a side line therefrom forming a loop and returning to said first line at a second mixing location which is in a second chamber, a first chamber comprising said turbulence creating means in said loop at a first mixing location in said first chamber and first inlet at said first location for at least one other component of said depositable mineral salt, and a second line and second inlet for said second component into said second mixing chamber. Preferably the first and second inlets for the second component are joined by a third line; advantageously the apparatus has a fourth line for the second component, said fourth line having a side line leading to said first inlet and the rest of the fourth line leading to the second inlet.

Thus, preferably the apparatus comprises said first and second lines, meeting at a second mixing location, side lines from each of the first and second lines which side lines meet at a first mixing location, means for creating turbulence e.g. cavitation at said first mixing location and an exit line from said second mixing location to said second mixing location.

If desired, there may be 2 first lines, one to each of the first and second chambers, and 2 second lines, one to each of the first and second chambers, the first lines being separate from each other, and the second lines being separate from each other. Also, if desired, the outlet from said first chamber may be linked to said second line spaced from said second chamber.

In the event that the solution of the first component contains sufficient of the first component that the suspension leaving the second mixing location still contains enough first component to effect more solidification with the solution of the second component, the second line may extend to lead to a third mixing location where it meets the exit line from the second mixing location. This disposition of lines may be repeated one or more times, to effect multi-step series addition of the second component, (e.g. sodium sulphate solution such as sea water) to a first component e.g. barium chloride solution such as formation water.

Preferably, the apparatus of the present invention includes a means for monitoring the size of the crystals. Alternatively, a separate apparatus may be provided to monitor the size of the crystals. This allows any failure or malfunction of the apparatus of the present invention to be detected before mineral salt can build up on the solid surface.

The invention is particularly applicable to the reduction of mineral salt e.g. barium sulphate scaling.

Underground formation water can contain barium (e.g. at a level of up to 3000 ppm, for example 50–500 or about 250 ppm) and usually also calcium (e.g. at a level of up to 30,000 ppm, for example 1000–5000 ppm, such as 2500 ppm) both in the form of soluble chlorides, but also in the presence of sulphate ions, so the water is saturated with barium sulphate, and usually also calcium sulphate. This formation water can meet another aqueous composition e.g. sea water, which can contain soluble carbonate (e.g. at 100–5000 ppm) and/or sulphate (e.g. at 1000–3500 ppm); the other composition may also be a formation water from a different formation e.g. different strata level. Mixing the two waters produces an aqueous supersaturated solution of barium sulphate and/or carbonate, and/or calcium sulphate and/or carbonate, from which scale comprising these compounds deposits on surfaces. The meeting can be in the formation, when sea water is used as a secondary injection liquid injected at a distance from a production well to increase its production rate, (i.e. a water flood treatment). The scaling may occur in the formation or at locations downstream thereof in the production well pipeline or downstream thereof (especially if different formation waters meet there), or downstream thereof e.g. in the well head lines, or gas/liquid separator (for separating oil/water liquid from gas) or downstream thereof, (especially when live crude oils with different formation waters are passed to the same separator) or in any transport pipeline leaving the separator or the well head carrying the crude oil or produced water or both or especially in any production water pipeline downstream of any separator for separating crude oil from production water, in particular when different production waters have been mixed. The carbonate scale may also form in the gas/liquid separator or downstream thereof, due to reduction in gas pressure causing soluble calcium bicarbonate to form insoluble calcium carbonate. The treatment of the invention can be applied upstream of the above locations where scaling would otherwise happen, for example, at the well head or by injecting a seeded stream down a wellbore using a conventional injection system. Particularly the treatment is applied when two or more formation waters or production waters meet, or either or both meet sea water; such mixings are otherwise desirable when the waters especially production waters from more than one source are to be reinjected downhole via a single line. The treatment is especially applied between a produced water separator and such a comingling location prior to a single reinjection well. Where re-injection of produced water is practised, it is preferred that all of the re-injected produced water stream is treated.

As explained above, the barium sulphate seed crystals used in the process of the invention are usually in a crystalline form, which is rectangular, oval, or undistorted rhomboid and preferably has voids, rather than the more conventional star shape or distorted rhomboid shape.

The present invention provides barium sulphate crystals having 3 dimensional distances of length, breadth and thickness, normal to one another, and one of which is 0.4–1.5 times the dimensional distance of the other, especially with the dimensions in a ratio of 0.4–1.5:1:0.4–1.5, such as 1–1.5:1:0.4–0.8. Preferably, the crystals have one or more voids therein e.g. 1–4, but especially 1 void. The voids are usually open on at least one side to the envelope of the outer surface of the crystals, rather than being wholly enclosed. The voids preferably occupy 5–40% e.g. 10–30% of the volume enclosed by the envelope of the outer surface of the crystals. By envelope is meant the outer delimiting surface of the crystals. The crystals may be rectangular in at least 2 dimensions, especially cuboid. The voids may have linear or curved inner faces, especially curved faces, so the crystals are preferably rectangular with 1 or 2 voids having curved inner faces. Angular crystals tend to be made from highly supersaturated solutions with low turbulence treatment times e.g. 0.5 to 5 sec. The crystals may also be ovoid, with an ellipsoidal envelope, but again preferably have one or more voids, such as those described above; these may be made from highly supersaturated solutions with high turbulence treatment times e.g. 5–30 sec. The crystals may also be rhomboid in which case the crystals may have two flattened corners and two pointed corners. Rhomboid crystals tend to have dimensions in a ratio of 0.4–0.6:0.9–1.1:0.9–1.1, for example, 0.5:1:1 (thickness:length:width).

The barium sulphate crystals are usually substantially free from any barium or sulphate containing liquid and hence are usually isolated mineral salts. Their particle sizes are usually as described above. The particle size distribution is usually within at least one of the following; at least 35% of not more than 1 micron, at least 50% of not more than 1.5 micron and at least 60% of not more than 2 micron.

The barium sulphate crystals are usually made as described generally above, but especially by physically disrupting e.g. cavitating an aqueous supersaturated solution containing barium and sulphate ion before significant nucleation starts, i.e. starting this disruption in the substantial absence of preformed crystals of barium sulphate different morphologically from those of the invention. The crystals of the invention are preferably made by application of ultrasonic vibrations to the aqueous supersaturated solution, especially at a location where separate flows of solutions comprising barium and sulphate ions meet. The conditions of the ultrasonic treatment are usually as generally described above, with short treatment times giving the rectangular crystals with voids, and long treatment times giving ovoid crystals often with voids. The process provides a suspension of crystals in a solution of barium sulphate, from which the crystals can be isolated if desired by filtration.

When the barium sulphate seed crystals having voids are used to seed an aqueous supersaturated solution of barium sulphate (or aqueous precursor liquid therefor), it has been found that, in the produced barium sulphate crystals, the voids are smaller or substantially absent, with the voids from the seeds being at least partly filled with the fresh barium sulphate deposited from the solution or liquid.

The present invention also provides rounded calcium carbonate crystals. Preferably, the calcium carbonate crystals have a diameter in the range of 1 to 2.5 microns, preferably 1.5 to 2.5 microns, for example 2 microns. The calcium carbonate crystals are usually made as described generally above, but especially by physically distributing e.g. cavitating an aqueous supersaturated solution containing calcium and carbonate or bicarbonate ions before significant nucleation starts (as for barium sulphate).

Without wishing to be bound by any theory, it is believed that the seed crystals used in the process of the present invention are more effective at growing crystals in the body of an aqueous supersaturated solution rather than allowing deposition on neighbouring surfaces, compared to processes with other kinds of seed crystals added in a different way. It is also believed that the seed crystals act by accelerating the rate at which mineral salt precipitates from solution.

The barium sulphate seed crystals are especially suitable for decreasing barium sulphate scaling.

BRIEF DESCRIPTION OF THE DRAWINGS

The invention is illustrated with reference to the following drawings in which.

DETAILED DESCRIPTION OF PREFERRED EMBODIMENTS

Figure 1:
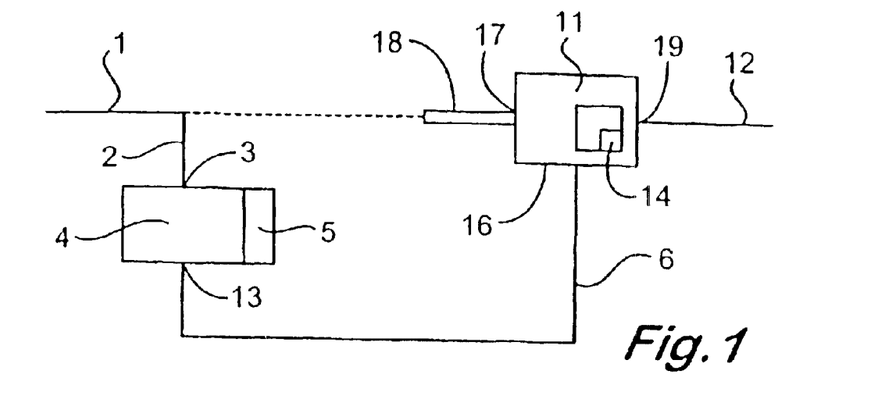
FIGS. 1 to 3 are schematic flow diagrams of the process of the invention.

Referring now to FIG. 1, line 1 has a inlet line 2 leading to an inlet 3 to a chamber 4, having appliable to at least part of its contents turbulence generator 5 e.g. a cavitation generator, and especially an ultrasonic resonator. Chamber 4 has an outlet 13 for a slurry of the seed crystals leading via a slurry line 6 to a chamber 11 fitted with a mixer 14.

Chamber 11 has an inlet 16 joined to slurry line 6, an inlet 17 joined to input line 18 and an outlet 19 leading to product line 12. In use, an aqueous solution of a depositable mineral salt passes in line 1 via line 2 to chamber 4 where it is rendered turbulent by generator 5 to produce a slurry of seed crystals of the mineral salt. The slurry passes in line 6 to chamber 11 where it mixes with supersaturated solution entering from line 18 and effects crystallisation thereafter before the aqueous supersaturated solution reaches a locus of deposition (not shown) where mineral salt would otherwise have deposited if the turbulence generator had not been used. This procedure is of particular value when the rate of deposition of mineral salts from the supersaturated solution is slow, or the degree of supersaturation is small. Line 18 may include a producer for increasing the degree of supersaturation of the aqueous supersaturated solution (not shown) which producer may be a pressure reducer (for calcium carbonate) to deliver a higher supersaturated solution for meeting the slurry from line 6. Chamber 4 may also comprise such a producer, though it may be present in line 2 (not shown) to create an aqueous supersaturated solution in chamber 4. Thus, if desired the liquid in line 1 upstream of line 2 or in line 18 may be saturated or even less than saturated in the depositable mineral salt, so long as there is such a producer upstream or at of each of chambers 4 and 11. When as shown, lines 1 and 18 are separate, there are different lines for supersaturated solution passing to chambers 4 and 11, so, the solution passing to chambers 4 and 11 may be different, though of the same components, e.g. at different concentrations. Preferably, (as shown dotted in FIG. 1) lines 1 and 18 are joined so the same aqueous supersaturated solution passes to both chambers, and lines 2 and 6 constitute a side line or loop on line 1.

Figure 2:
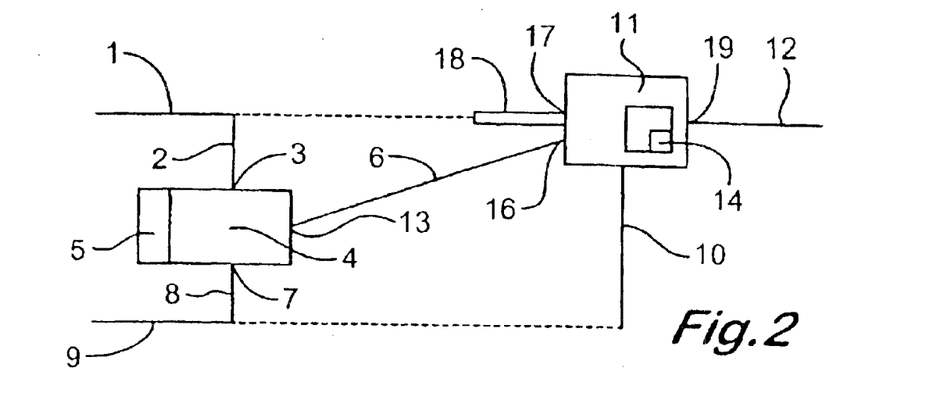

In FIG. 2, comparable lines to those in FIG. 1 have the same designation, so feed line 1 has an inlet line 2 and slurry line 6 spaced by chamber 4 with turbulence generator 5 e.g. cavitator especially ultrasonic generator. Chamber 4 has an extra inlet 7, joined to feed line 8, which leads from feed line 9. Line 10 and slurry line 6 meet an input line 18 at chamber 11 which also contains mixer 14 and, from which a product line 12 leaves. As described with respect to FIG. 1, lines 1 and 18 are preferably joined (shown dotted in FIG. 2) and lines 9 and 10 are preferably joined (shown dotted in FIG. 2). In use, a first solution of one component of a depositable mineral salt, which is a saturated aqueous solution thereof (e.g. formation water of significant barium ion concentration in a saturated barium sulphate solution) passes in line 1 and then via line 2 chamber 4. A second solution of a second component of the depositable mineral salt (e.g. sea water containing sulphate ion) passes in line 9 in to line 8 to chamber 4. The first and second solutions meet in chamber 4 under conditions of turbulence from generator 5, to produce a slurry of seed crystals e.g. of barium sulphate. The slurry leaves chamber 4 via outlet and line 6 to enter chamber 11, where it meets more first and second solutions entering from lines 1 and 10 respectively and mixed by mixer 14. In the chamber 11, there is strong agitation of the aqueous supersaturated solution produced from first and second solutions, in the presence of the seed crystals from line 6. Crystallisation occurs in the liquid to give mineral salt having a reduced tendency to deposit on surfaces. The mixture of mineral salt and saturated solution passes in product line 12 through the zone of deposition downstream, (not shown) where mineral salt would otherwise have deposited. This apparatus is especially suitable when the rate of mineral salt deposition from the aqueous supersaturated solution would be high if features 2–19 were absent. It is suited where supersaturation very rapidly occurs from the mixing of 2 solutions e.g. barium sulphate supersaturated solution resulting from mixing of sea water and barium ion containing formation water.

If desired (not shown) a stepwise crystallisation from line 1 in FIG. 2 may be used with one or more further chambers 11A, 11B etc. downstream in line 12 and one or more successive feed lines 10A, 10B etc. from line 10 into the further chambers 11A, 11B etc. (not shown).

As with FIG. 1, the lines 1 and 18 to chamber 4 and 11 may be for containing different solutions, e.g. different formation or production waters or different sea waters and likewise the lines 8 and 10 to chambers 4 and 11 may also be for containing different solutions e.g. different sea waters (not shown). When lines 1 and 18 are joined and 9 and 10 are joined, the same solutions can be used to provide both first solutions and second solutions respectively.

Figure 3:
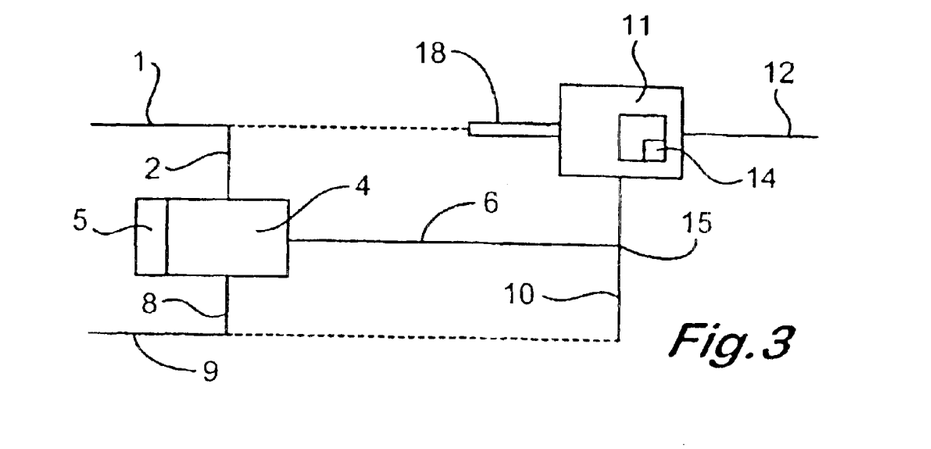

FIG. 3, shows a modification of the apparatus shown in FIG. 2 in which the line 6 does not join chambers 4 and 11 but rather joins chamber 4 to line 10 at location 15. In use the slurry of crystals leaving chamber 4 is passed to line 10 at location 15 where it is diluted by the second component solution (e.g. sodium sulphate solution, such as sea water) and the diluted slurry produced is passed to chamber 11. In this way the seed crystals are more easily distributed in chamber 11 with the aqueous supersaturated solution for aqueous precursor liquid from line 1, because they have already been partly distributed in one of the other liquids feeding chamber.

Figure 4:
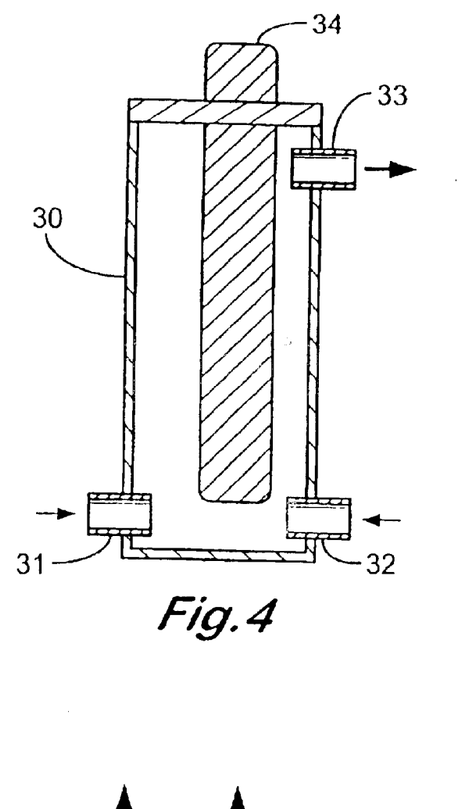
FIGS. 4 to 8 illustrate apparatus which may be used in the process of the invention.

FIG. 4 illustrates an ultrasound apparatus comprising a crystal seed generator chamber 30, a first inlet 31 for a first aqueous solution (for example, seawater), a second inlet 32 for a second aqueous solution (for example, formation water), an outlet 33 for a "seeded" stream, and an ultrasonic resonator 34 which projects into the crystal seed generator chamber 30. For a crystal seed generator chamber of 2.5 liter capacity, the seeded stream may be withdrawn from the crystal seed generator chamber at a flow rate of up to 75 liters/min.

Figure 5:
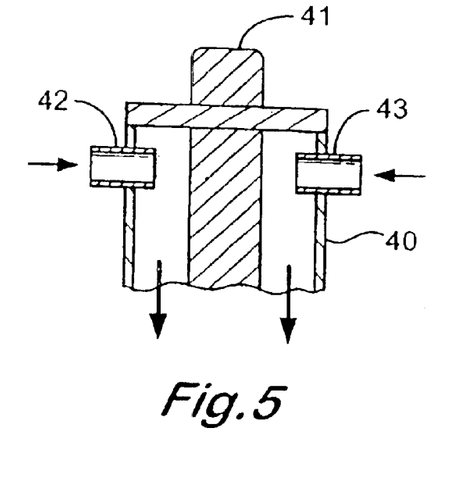

FIG. 5 illustrates an alternative arrangement of the ultrasound apparatus in which the crystal seed generator chamber 40 is tubular, an ultrasonic resonator 41 projects into the crystal seed generator chamber 40 and is arranged centrally so as to lie along the longitudinal axis of the chamber. The first and second aqueous solutions are fed to the crystal seed generator chamber 40 via a first inlet 42 and a second inlet 43 respectively and flow through the annulus between the walls of the crystal seed generator chamber 40 and the ultrasonic resonator 41.

Figure 6:
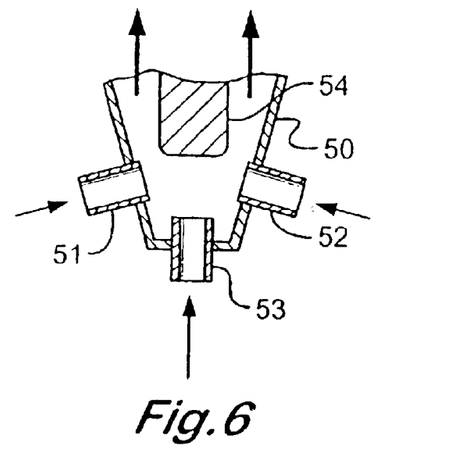

A further arrangement is shown in FIG. 6 in which the first aqueous solution is fed to the crystal seed generator chamber 50 via inlets 51 and 52 and the second aqueous solution enters the crystal seed generator chamber via inlet 53. The solutions are mixed at the tip of the ultrasonic resonator 54 which projects into the crystal seed generator chamber 50.

Figure 7:
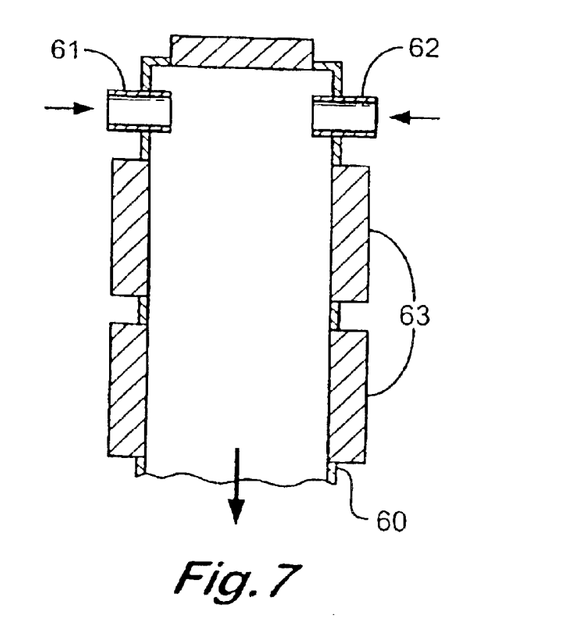

In FIG. 7, crystal seed generator chamber 60 had a first inlet 61 for the first aqueous solution and a second inlet 62 for the second aqueous solution. A plurality of ultrasonic transducers 63 are externally mounted on the walls of the crystal seed generator chamber 60.

Figure 8:
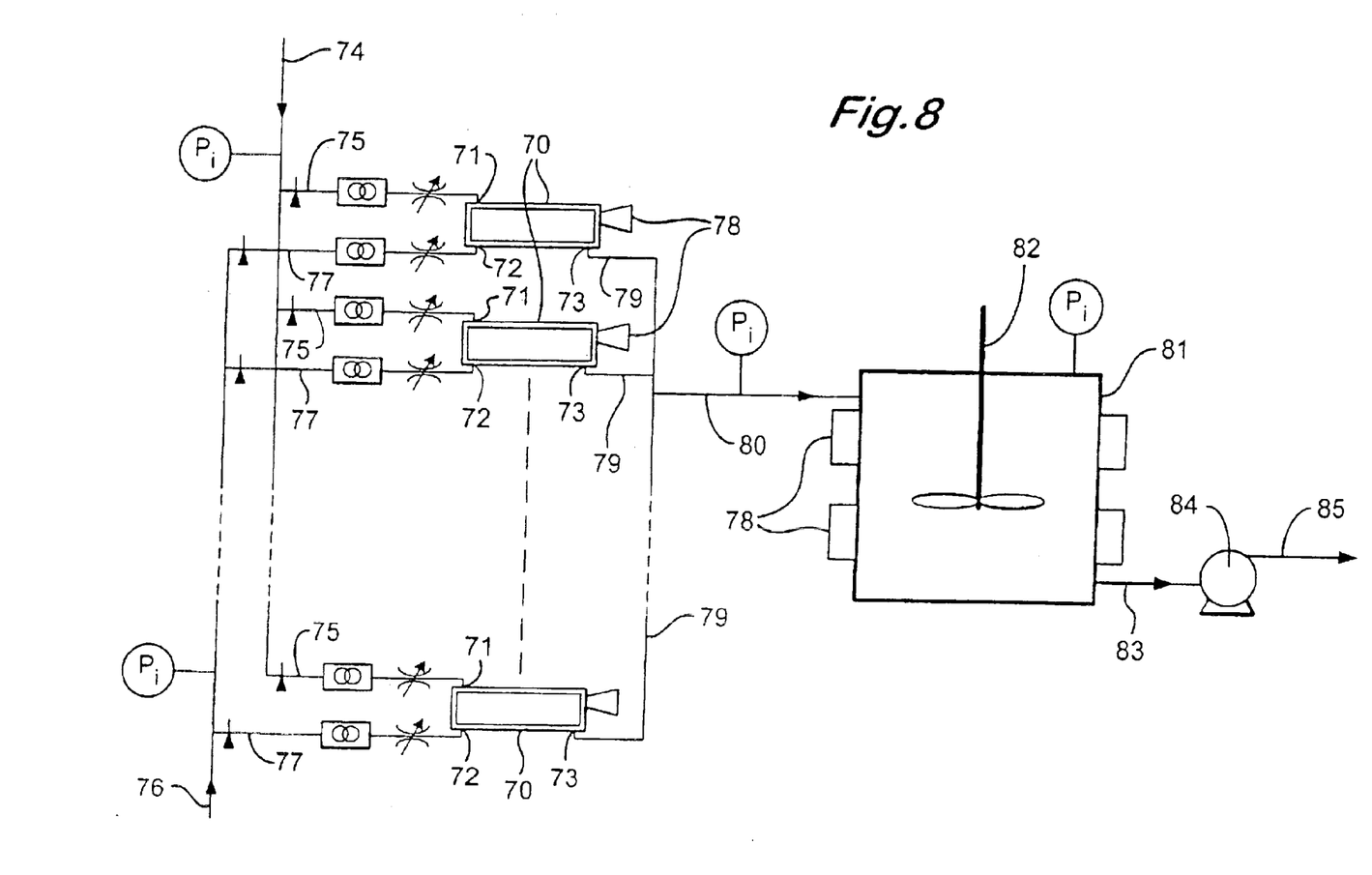

FIG. 8 shows an apparatus comprising a plurality of ultrasonic crystal seed generator chambers 70 arranged in parallel, each reactor having a first inlet 71, a second inlet 72 and an outlet 73. A first aqueous solution is fed to each of the crystal seed generator chambers 70 via line 74, branch lines 75 and the first inlets 71. A second aqueous solution is fed to each of the crystal seed generator chambers 70 via line 76, branch lines 77 and the second inlets 72. Each of the crystal seed generator chambers is fitted with an ultrasonic resonator 78. A partially seeded stream is withdrawn from the crystal seed generator chambers 70 via the outlets 73 and is passed via lines 79 and line 80 to mixing tank 81 (further crystal seed generator chamber). A plurality of ultrasonic resonators 78 are externally mounted on the walls of the mixing tank 81 which is also provided with a stirrer 82. A dispersion of seed crystals is withdrawn from the mixing tank 81 via line 83 and is passed via pump 84 and line 85 to an injection point (not shown). The operation of the pump 84 is controlled so that the dispersion of seed crystals is re-injected into the aqueous fluids which are to be treated at an appropriate flow rate and pressure. Each of the crystal seed generator chambers 70 may be operated independently of one another. The nominal flow of liquid through each of the crystal seed generator chambers 70 may be 80% of the maximum flow rate through the crystal seed generator chambers (a built in redundancy of 1 chamber in 5). The mixing tank 81 is large enough to accommodate all of the flow of liquid through the crystal seed generator chambers 70 and the residence time in the mixing tank 81 is determined according to the crystallisation rate of the seed crystals arising from the aqueous solutions which are being treated. The stirrer 82 aids the crystallisation process and ensures that the supersaturation of the aqueous solution in the mixing tank is reduced to saturation level. For optimal efficiency of the system the pressure in the mixing tank 81 should be maintained at below 5 bar, more preferably below 2.5 bar. Typically, where the first aqueous solution is formation water and the second aqueous solution is seawater, the dispersion of seed crystals is re-injected into seawater, which is then used to treat produced water. Typically, the apparatus may have five crystal seed generator chambers in parallel delivering a partially seeded stream to mixing tank 81 at a flow rate of 300 liters/min. Where the mixing tank is cylindrical (diameter 0.70 meters×height 1 meters), this gives a minimum residence time of 5 minutes. It is believed that this residence time will be sufficient to reduce the supersaturation to saturation level.

Figure 9:
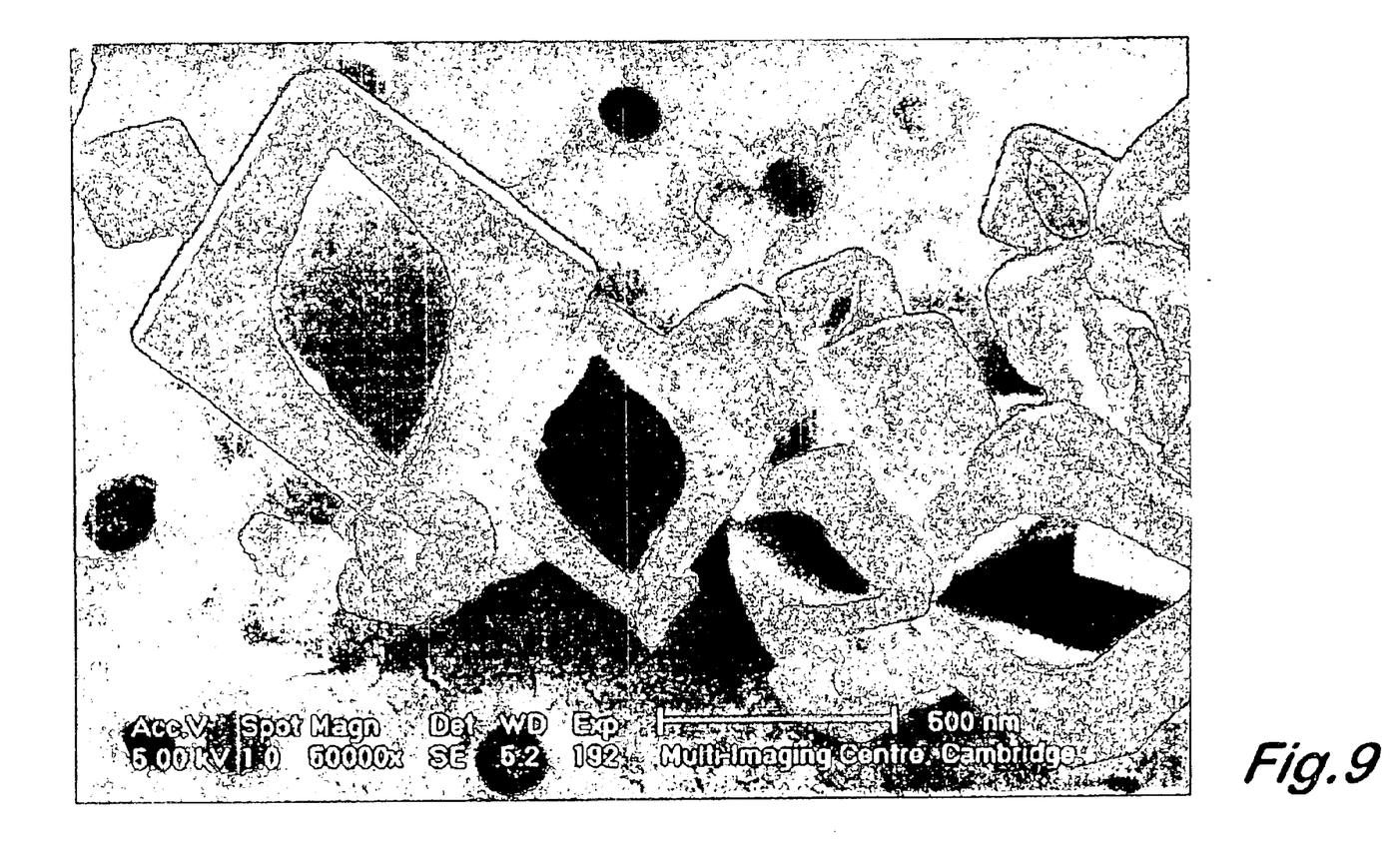
FIGS. 9 to 11 are Scanning Electron Micrographs (SEMs) of barium sulphate crystals and FIGS. 12 and 13 are Scanning Electron Micrographs of calcium carbonate crystals.

FIG. 9 is an SEM photograph of seed crystals of barium sulphate having voids, produced using ultrasound.

Figure 10:
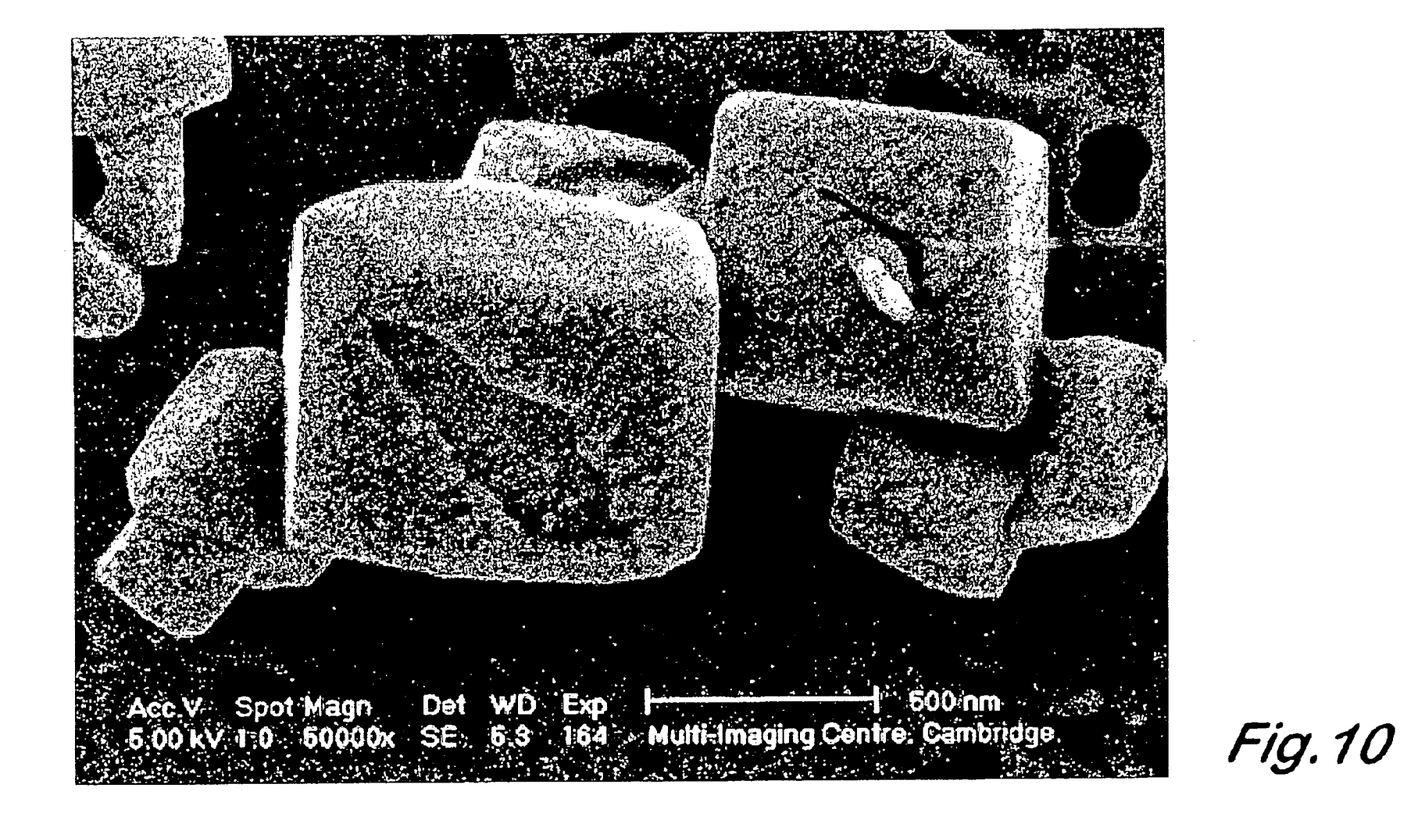

FIG. 10 is an SEM photograph of seed crystals of barium sulphate which have been used to seed an aqueous supersaturated solution of barium sulphate in which the voids have been at least partially filled with barium sulphate deposited from the aqueous supersaturated solution.

Figure 11:
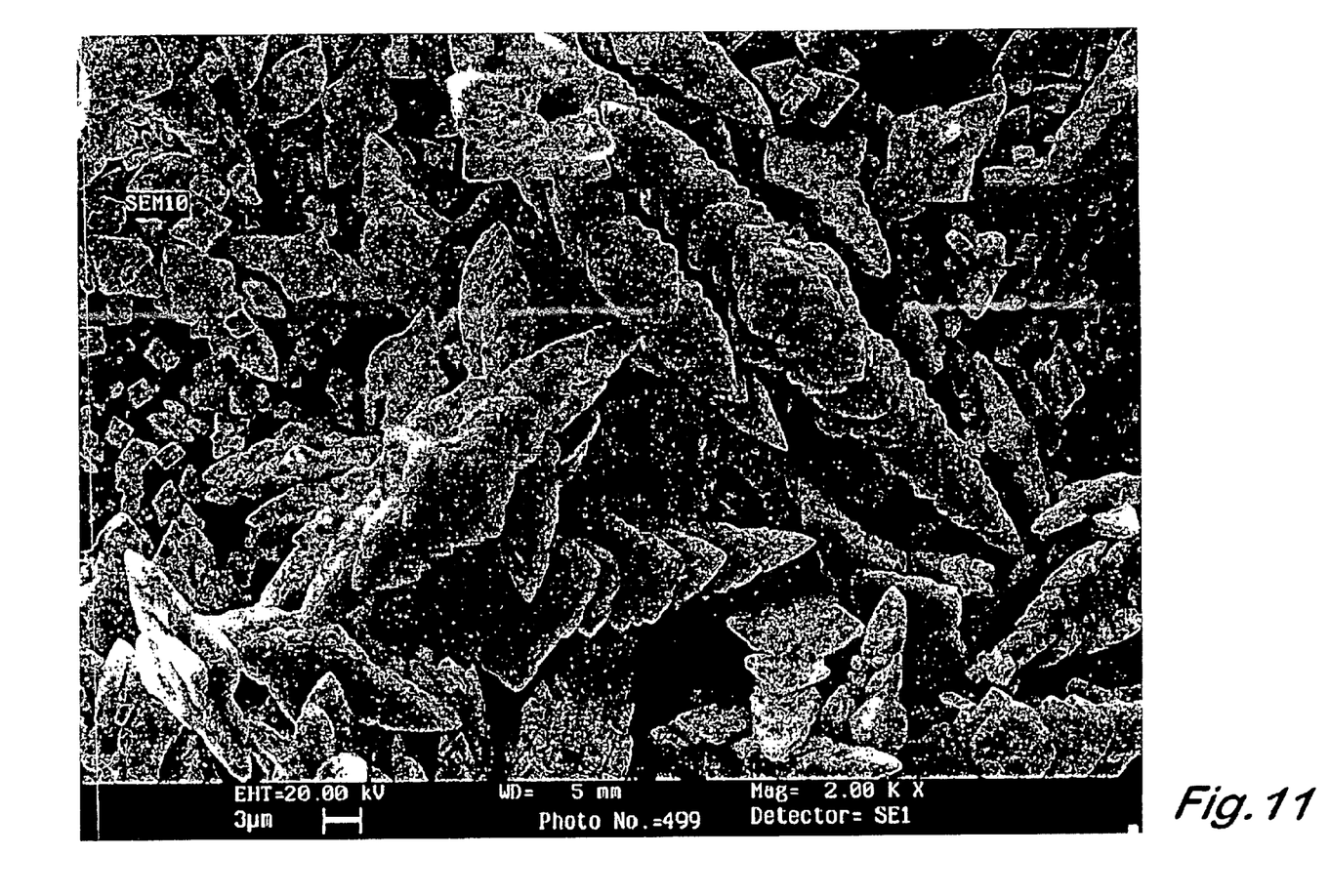

FIG. 11 is an SEM photograph of crystals of barium sulphate which were allowed to crystallise out of a saturated aqueous solution without any outside influences apart from gravity and time.

Figure 12:
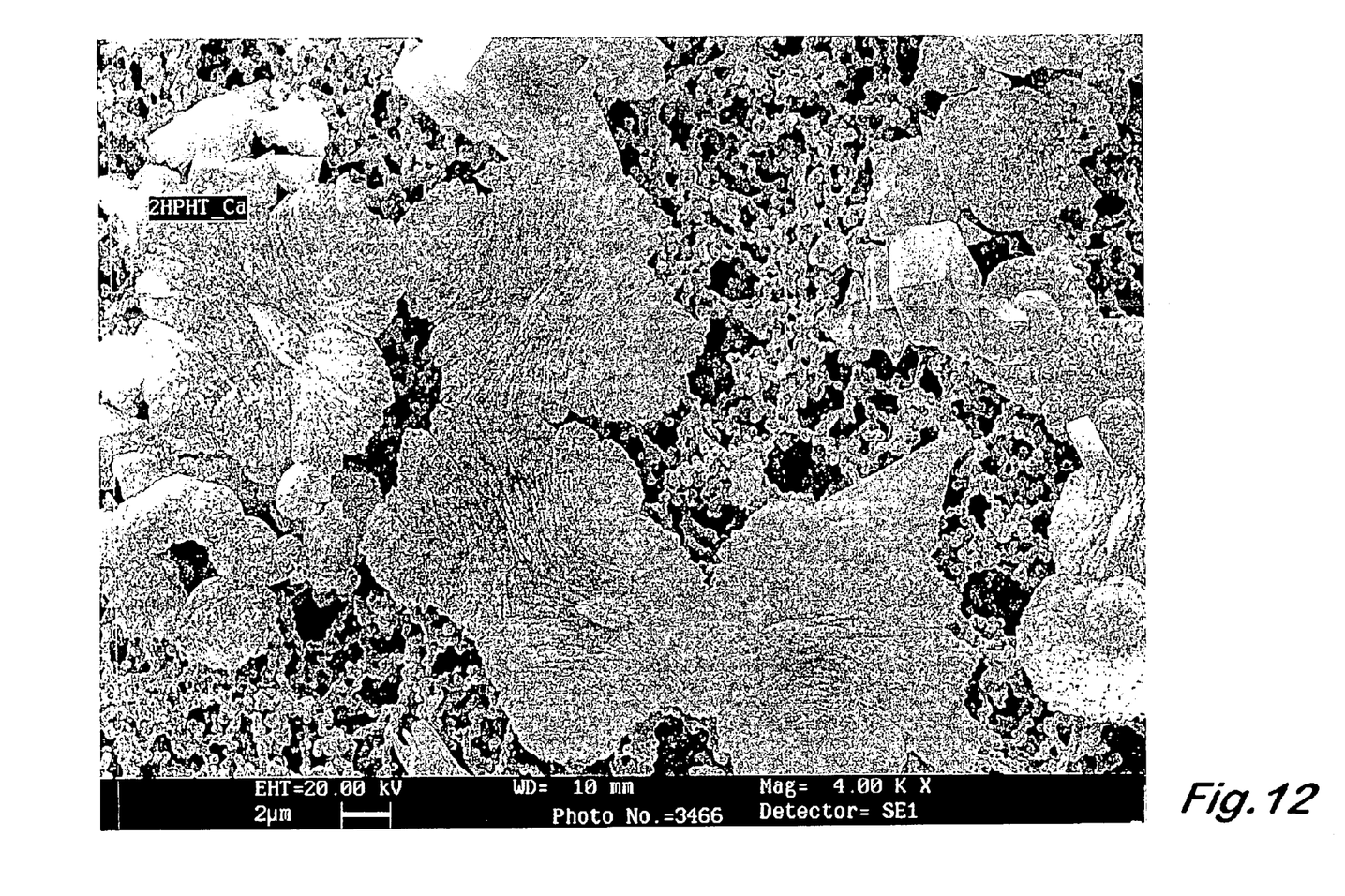

FIG. 12 is an SEM photograph of seed crystals of calcium carbonate which were allowed to crystallise out of a saturated aqueous solution without any outside influences apart from gravity and time.

Figure 13:
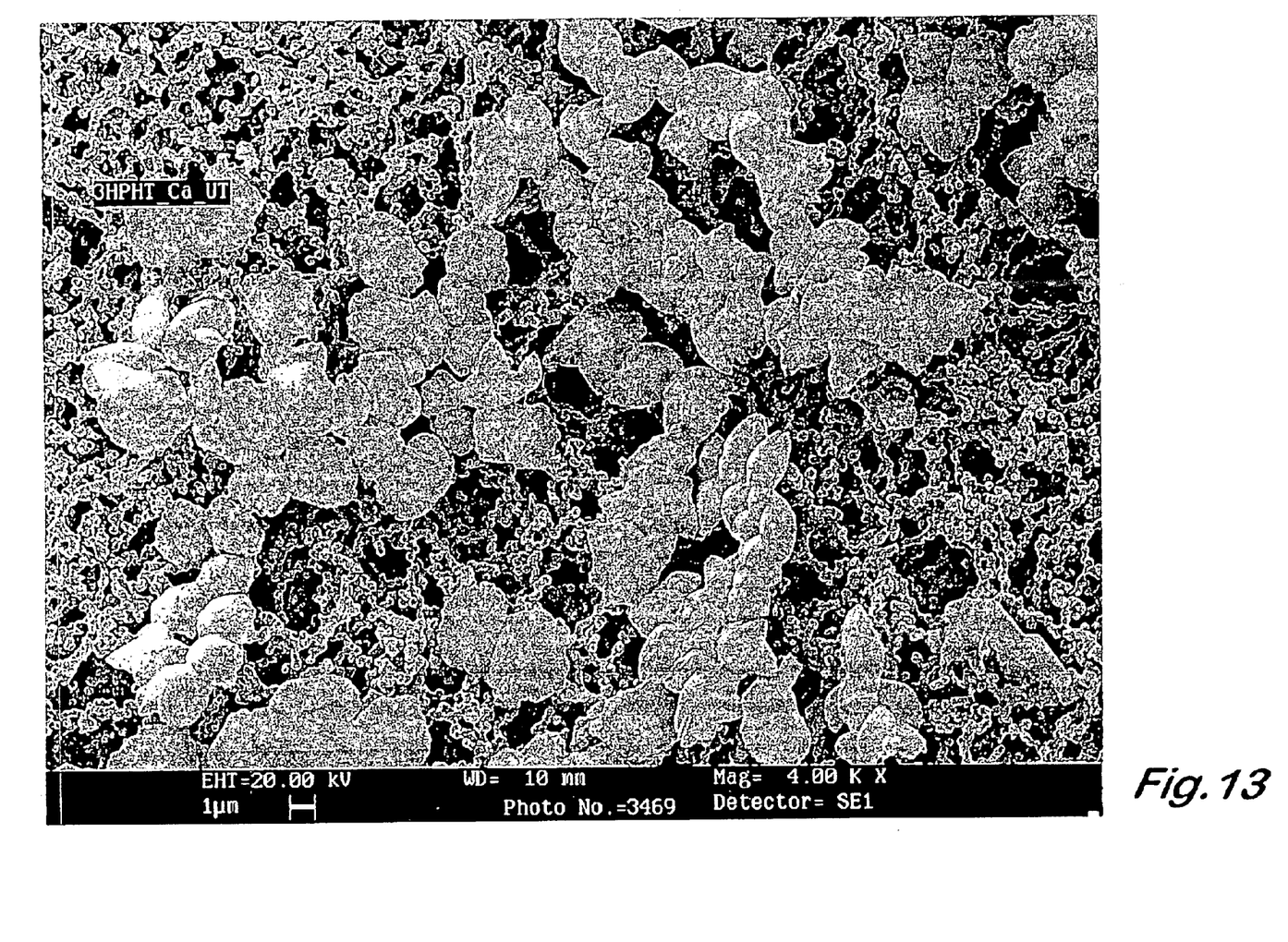

FIG. 13 is an SEM photograph of crystals of calcium carbonate produced using ultrasound.

The invention is illustrated in the following Examples.
Particle Sizing

The Mean particle size of the seed crystals and control crystals (crystals formed in the absence of ultrasound) were determined by analysing SEM images of the crystals and by using a laser light scattering technique. The latter was performed using a Galai Computerised Inspection System (sold by Roth Scientific). The Galai instrument passes a beam of laser light through a stirred sample (suspension of crystals in an aqueous solution). A detector (photo diode) is positioned directly opposite the source of the radiation beam and detects laser light passing through the sample when the detector is not obscured by a crystal particle. The length of time that the detector is obscured by a crystal particle is proportional to the diameter of the particle sitting in the laser beam (between the source and the detector). A distribution of obscuration times, and hence chord lengths, are measured, and computer software is used to calculate a size distribution of spherical particles from the range of chord sizes measured. Thus, the mean diameter is an equivalent spherical diameter which essentially corresponds to the length of the longest dimension.

EXAMPLE 1

The apparatus as illustrated in FIG. 2 was used with lines 1 and 18 joined and 9 and 10 joined, with flow rates of 0.05 ml/min of Formation Water (FW) in line 2, 4.95 ml/min of FW entering chamber 11 from line 18, 0.05 ml/min of Sea Water (SW) in line 8 and 4.95 ml/min of SW entering chamber 11 in line 10, and 0.1 ml/min of seed crystal suspension entering chamber 11 in line 6. A coil of stainless steel tube one sixteenth of an inch (1.6 mm) internal diameter was present in line 6 and another in line 12, both for liquid hold up purposes and a blockable tube downstream of the coil in line 12 was present to determine blocking pressures or deposition rates. The lines 1, 2, 6, 8, 10 were all (one eighth inch (3.2 mm) ID tube.

The Formation water in lines 2 and 10 contained:

NaCl (64.24 g/L), NaHCO$_3$ (2.82 g/L), CaCl$_2$.2H$_2$O(2.35 g/L); KCl (2.25 g/L), BaCl$_2$.2H$_2$O(1.39 g/L), MgCl$_2$.6H$_2$O (0.88 g/L), SrCl$_2$.6H$_2$O (0.24 g/L) in 1 liter water and pH adjusted to 4.5 by dropwise addition of dilute hydrochloric acid or sodium hydroxide.

The Sea Water in lines 8 and 10 was at pH 4.5 and contained:

NaCl (23.97 g/l), NaHCO$_3$ (0.17 g/l), CaCl$_2$.2H$_2$O (1.57 g/l), KCl (0.87 g/l), MgCl$_2$.6H$_2$O (11.11 g/l), SrCl$_2$.6H$_2$O (0.024 g/l), Na$_2$SO$_4$.10H$_2$O (9.93 g/l) in 1 liter of water.

Chamber 4 had a mixer and ultrasonic horn 5 (maximum power of 5000 J/cm$^3$), at a frequency of 20 kHz at the points of mixing of the waters from lines 2 and 8.

Action of the ultrasound produced turbulent flow in the mixer in chamber 4 of Reynolds Number of at least 2000. Chamber 11 contained a T piece mixer for mixing the streams from lines 6, 10 and 18, under conditions of turbulent flow.

The process was performed without use of the ultrasound generator 5 and then with ultrasound generator 5 which had been operated for 2–3 seconds to ensure equilibrium was reached. In each case slurry in the tube upstream of chamber 11, but downstream of the coil was analysed and the nature of the barium sulphate crystals in it determined by Scanning Electron Microscopy and their particle size determined. The results were as follows; without ultrasound, Mean particle size 2.04 microns, Standard Deviation 2.01 microns No of particles per ml (×10$^6$)35, with ultrasound Mean particle size 1.03 microns, Standard Deviation 0.71 micron and No of particles/ml(×10$^6$)159.

The slurry in line 6 at the time of entry to Chamber 11 contained 10% by weight barium sulphate crystals in a solution thereof The crystals from use of ultrasound were substantially rectangular with larger curved voids extending inwardly from the surfaces, while those obtained without use of ultrasound were star shaped (see Attached SEM photographs FIGS. 9 and 11).

In addition, in a separate experiment without ultrasound, barium sulphate seeds of 1.03 microns Mean particle size (generated upstream of the seed injection point in the ultrasound mixing chamber described above) were present in the Formation Water added to Chamber 11. The analysis of crystals downstream of chamber 13 showed mean size 2.58 microns, Standard Deviation 1.81 microns, No of particles/ml(×10$^6$) 35.

The weight of crystals deposited in the coil tube downstream of chamber 11 (expressed as mg barium sulphate per 1 of solution passed) was also determined with time by measuring the concentration of eluted barium (in solution) using inductively coupled plasma spectroscopy (ICP). After 7 hours with no ultrasound about 60 mg/l of mineral salt had been deposited, while in the experiments with ultrasound the deposits were 25–32 mg/l, and this level remained at least until 24 hours.

EXAMPLE 2

The process of Example 1 with ultrasound was repeated with a lower ultrasound power input namely 1600 J/cm$^3$. Similar results to those in Example 1 were obtained for the particle (crystal) size parameters.

EXAMPLE 3

The process of Example 1 was repeated but with the apparatus of FIG. 3, with separate feed lines of formation water in lines 1 and 18 to chambers 4 and 11, and with separate feed lines of sea water in lines 8 and 10. In this way the effect of different relative flow rates of seed slurry in line 6 and formation water into chamber 11 was changed. The results were as follows. Flow rates in lines 1 and 6 were 2 l/min., and 8.7 l/min in each of the lines for formation and sea water into chamber 11. These give a percentage of seed slurry to total liquid in chamber 11 of 10% (by weight). Residence times were 3.1 sec from chamber 4 to location 15, 3.5 sec from, location 15 to chamber 11, and 3.8 sec from chamber 11 to the blockable tube. No blocking occurred. With the latter two residence times reduced to 2.1 sec and 1.2 sec respectively (and sea water and formation water flow rates of 8.5 l/min each giving a 11% seed percentage) blocking occurred.

With different flow rates (namely 4 l/min for formation and sea water, giving 20% seeding, and residence times (as above) of 3.1, 3.6 and 2.3 secs respectively, there was again no blocking (and no deposit in the blocking tube).

With different flow rates (namely 3 l/min for formation and sea water) and 4 l/min for seed crystal slurry, giving 40% seeding, and residence times (as above) of 1.5, 3.1 and 2.3 secs respectively, again there was no blocking and only 2 mg/l deposit in the blocking apparatus.

In each case the energy per unit volume of liquid in chamber 4 from resonator 5 was in the range of 5–80 J/cm$^3$.

EXAMPLE 4

The process of Example 3 was repeated with all the formation water and seawater mixed in chamber 4 to give a total flow rate of 6 l/min and no addition of extra in lines 10 and 8. The example was repeated with and without ultrasonic generation of turbulence. Without ultrasonics, the pressure in the blocking tube rose to 5.8 bar after passage of 50 liters of total water giving 340 mg/l deposit, while with ultrasonics, the pressure was still substantially zero after 520 liters of water had been passed and only 13 mg/l of deposit had formed.

In related experiments performed at 20 l/min total volume and with and without ultrasonics, the average particle size of the mineral salt produced after the mixing point was 1.05 microns with ultrasonics and 5.6 microns without ultrasonics.

EXAMPLE 5

A formation water containing NaCl (74.1821 g/l), KCl (0.71 g/l), NaHCO$_3$ (0.68 g/l), CaCl$_2$.2H$_2$O (10.3 g/l), MgCl$_2$.6H$_2$O (4.22 g/l), SrCl$_2$.6H$_2$O (1.75 g/l), BaCl$_2$.2H$_2$O (0.45 g/l) was rapidly mixed with seawater (500 ml; having the same composition as in Example 1) in an ultrasonic apparatus of similar design to that employed in Example 1 and was sonicated at 20 kHz for 10 seconds to generate seed crystals (ultrasonically generated crystals). The experiment was repeated without the application of ultrasound (Control, non-sonicated crystals).

Samples of the crystals were examined by SEM. Measurements were made of the size and morphology of the crystals using printed images. The results obtained by measuring 100 control crystals and 112 seed crystals are presented in Tables 1 and 2 below.

Generally, the crystals were thin rhomboids having two flat corners. The crystal "length" measurement was made between the flattened ends of the crystal and the "width" measurement was made between the two pointed ends of the crystal.

TABLE 1

| Crystal dimensions | | |
|---|---|---|
| | Control crystals | Seed crystals |
| Length (L) | 3.3 μm | 1.09 μm |
| Width (W) | 2.6 μm | 1.09 μm |
| Thickness | 0.5 μm (approx.) | 0.5 μm (approx.) |
| Aspect ratio (L:W) | 1.27 | 1.00 |
| Voids[a] | 0 | 39% |

[a]Percentage of crystals having voids

The control crystals were generally uniform in morphology. In contrast, the seed crystals were less uniform in morphology and were divided into the classes shown in Table 2.

TABLE 2

| Crystal Morphology | | | |
|---|---|---|---|
| Morphology Class | % in Class | Length (μm) | Width (μm) |
| Rhomboids | 54 | 1.06 | 1.05 |
| Rhomboids having voids | 39 | 1.04 | 1.01 |
| Six sided structure | 3.5 | | |
| Others | 3.5 | | |

EXAMPLE 6

The following formulated brines were employed in the tests described below:

Brine A: concentration of calcium ions (Ca$^{2+}$)=0.04M, pH 5

Brine B: concentration of bicarbonate ions (HCO$_3^-$)=0.08M, pH 7

Brines A and B were both allowed to reach complete saturation with CO$_2$ before the pH of each brine was recorded and adjusted, if necessary, with HCl or NaOH.

Test 1

A high pressure and high temperature (HPHT) tube blocking rig was connected to a HPHT mixing 'T' piece. The mixing 'T' piece (having a first inlet, a second inlet and an outlet) was fitted with an ultrasonic horn (¾" tip, 550W maximum output). The first and second inlets of the mixing 'T' piece were connected to a first liquid feed line and a second liquid feed line respectively while the outlet was connected to a one meter 1/16" blocking tube. A back pressure regulator (BPR) having an in-line filter was positioned at the exit of the blocking tube and maintained the pressure in the mixing 'T' piece and in the blocking tube at 200 bar.

The HPHT tube blocking rig was first primed to a pressure of 200 bar using distilled water. Distilled water was then allowed to flow through the first liquid feed line and second liquid feed line at a rate of 2.5 ml/min (both lines) until the water in the mixing 'T' piece had reached an equilibration temperature of 90° C. The feed to the first and second liquid feed lines was then switched to Brines A and B respectively (the flow rate through both lines being 2.5 ml/min). Brines A and B were mixed in the mixing 'T' piece to give a slurry of calcite crystals. The slurry then passed through the outlet of the 'T' piece into the blocking tube. The time taken to block the 1/16" blocking tube (after switching to Brines A and B) was 45 minutes. Samples were collected 40 mins after initiation of the flow of Brines A and B (downstream of the in-line filter) and were immediately further filtered for SEM analysis (Control; non-sonicated crystals). Since the samples were collected downstream of the in-line filter, only a small number of crystals were collected. SEM analysis of the calcium carbonate crystals showed that the crystals had a size of 10 $\mu$m (or less) with a flower-like morphology (FIG. 12).

Test 2

The procedure outlined above was repeated except that the ultrasonic horn was activated to 10% of its total output capability. The time taken for the 1/16" tube to block was 2 hours. Treated samples were collected after 1 hour for SEM analysis (ultrasonically generated seed crystals). SEM analysis of the ultrasonically generated crystals showed small rounded crystals, roughly 2 $\mu$m in size (FIG. 13).

Tests 1 and 2 show that calcium carbonate morphology is influenced by ultrasound applied during the crystal growth period. Crystals generated in Test 2 (using ultrasound) were rounded and much smaller than those grown without ultrasound. In addition, tube blocking time was extended from 45 mins to 2 hours.

EXAMPLE 7

Control

A brine containing NaCl (66.1 g/l), $MgCl_2.6H_2O$ (33.45 g/l), $CaCl_2.2H_2O$ (55.02 g/l) was slowly mixed with seawater (having the composition of Example 1) in a ratio of 50:50. It was found that it took several minutes for crystals to begin to appear (Control).

Insonification

Brine (150 ml) contained in a 500 ml beaker was insonificated using a 550W, 20 kHz probe. Seawater (150 ml) was rapidly added to the brine (whilst continuing to insonify the contents of the beaker). It was found that crystallisation occurred within seconds and the resulting mixture appeared pearlescent.

Analysis of the crystals by SEM showed that about 45% of the control crystals were sized below 1 $\mu$m whereas about 70% of the ultrasonically generated Crystals were sized below 1 $\mu$m.

EXAMPLE 8

Trials were performed using a hired test skid provided by Dyno A/S ("unit"). The unit comprised a "blocking tube" (a pipe composed of 316 stainless steel having a length of 0.5 meters and a nominal internal diameter of ¾ inch, into which was inserted 37×2.4 mm diameter 316 stainless steel rods) and an ultrasonic crystal seed generator chamber (as illustrated in FIG. 4). The ultrasonic probe comprised a Telsonics encapsulated PZT ultrasonic converter fixed to a "bar-shaped" stainless steel resonator (driven at a frequency of 20 kHz and providing up to 2000 W of power). The resonator provided both a radial and a longitudinal ultrasonic field. The ultrasonic probe and crystal seed generator chamber were placed in an explosion proof enclosure suitable for offshore use and the entire unit was certified for use in a hazardous area, Zone 1. The first and second inlets of the crystal seed generator chamber were connected to a first liquid feed line and a second liquid feed line respectively while the outlet was connected to line leading to the blocking tube. The unit was also provided with tie-in points for a seawater stream (containing sulphate anion) and a produced water stream (containing barium cation).

In a first mode of operation of the unit, the seawater stream and produced water stream were fed along flow lines from the tie-in points to a mixing point where the streams were mixed under controlled conditions. The mixed stream was then passed through the blocking tube which provided a preferential surface for the rapid deposition of scale (barium sulfate). The differential pressure across the blocking tube was monitored over a period of time and was found to give a good representation of scale deposition.

In a second mode of operation of the unit, a portion of the seawater stream and a portion of the produced water stream were passed via the first and second liquid feed lines respectively to the crystal seed generator chamber where the resulting mixture of seawater and produced water was subjected to an ultrasound field thereby generating seed crystals. A stream containing seed crystals ("seeded" stream) was withdrawn from the crystal seed generator chamber via the outlet and was passed along a line leading to the blocking tube. The remainder of the seawater stream and the remainder of the produced water stream were successively introduced into the seeded stream. The combined stream was then passed through the blocking tube and the differential pressure across the blocking tube was monitored over a period of time.

The effectiveness of the ultrasonic treatment was assessed by measuring the pressure differential ($\Delta P$) across the blocking tube at a temperature of 70° C. and an initial pressure of 3–5 barg. Table 3 shows the change in pressure across the blocking tube as a function of cumulative volume of liquid flowing through the blocking tube for two control experiments (first mode of operation of the unit; Experiments A and B) and for the second mode of operation of the unit (Experiment C). In Experiments A and B a produced water stream and a seawater stream were mixed in a 1:1 volumetric ratio at a total flow rate of 20 liters/minute. In Experiment C, a portion of the produced water stream and seawater stream (40% by volume of each stream) was introduced into the crystal seed generator chamber so as to generate a seeded stream. The amount of scale deposited in the blocking tube in Experiments A and B was 56 and 28 mg/liter respectively compared with 2.5 mg/liter in Experiment C. Thus, the effect of seeding was to reduce the deposition of scale and the consequent change in pressure across the blocking tube. This Example also demonstrates that the treatment method of the present invention is effective at elevated pressure and temperatures and may be used to treat water in the presence of residual oil and other contaminants (such as, trace amounts of corrosion inhibitors and scale inhibitors or particulates such as sand).

TABLE 3

Pressure change across the blocking tube

| Control A | | Control B | | Experiment C | |
|---|---|---|---|---|---|
| Cumulative Volume (liters) | Pressure (barg) | Cumulative Volume (liters) | Pressure (barg) | Cumulative Volume (liters) | Pressure (barg) |
| 0 | 0 | 0 | 0 | 0 | 0 |
| 60 | 0 | 5 | 0 | 20 | 0 |
| 130 | 1.5 | 25 | 0.2 | 60 | 0 |
| 150 | 2 | 45 | 0.4 | 120 | 0.1 |
| 160 | 2.5 | 65 | 0.2 | 200 | 0.2 |
| 180 | 3 | 85 | 0.3 | 260 | 0.2 |
| 200 | 3.4 | 105 | 0.3 | 340 | 0.1 |
| 220 | 3.5 | 145 | 0.5 | 400 | 0.2 |
| 250 | 4.5 | 165 | 0.7 | 500 | 0.2 |
| 280 | 5.5 | 185 | 0.9 | 600 | 0.3 |
| 300 | 6 | 225 | 1.5 | 680 | 0.3 |
| 320 | 6.5 | 245 | 1.8 | 800 | 0.4 |
| | | 265 | 2.1 | 880 | 0.4 |
| | | 285 | 2.4 | 1060 | 0.4 |
| | | 325 | 3.1 | 1120 | 0.4 |
| | | 365 | 3.9 | 1200 | 0.4 |
| | | 385 | 4.3 | 1280 | 0.4 |
| | | 405 | 4.7 | 1360 | 0.4 |
| | | 425 | 5 | 1420 | 0.5 |
| | | | | 1500 | 0.5 |
| | | | | 1620 | 0.6 |
| | | | | 1720 | 0.6 |
| | | | | 1840 | 0.6 |

We claim:

1. A method of reducing deposition of mineral salts from an aqueous supersaturated solution onto a solid surface in contact with the aqueous supersaturated solution which method consists essentially of:
   (a) forming a composition comprising a dispersion of either (i) seed crystals of the mineral salt in an aqueous solution of the mineral salt or (ii) seed crystals of a salt isomorphous with the mineral salt in an aqueous solution of the isomorphous salt wherein the dispersed seed crystals are of mean particle size of less than 2.5 microns and have been obtained via generation of cavitation in an aqueous supersaturated solution of the mineral salt or a salt isomorphous with the mineral salt;
   (b) distributing said composition into an aqueous precursor liquid that is saturated with the seeds, and converting the aqueous precursor liquid into an aqueous supersaturated solution of the mineral salt by (i) cooling and/or reducing the pressure of the aqueous precursor liquid or (ii) by adding a complementary ion to the precursor liquid; and;
   (c) contacting the aqueous supersaturated solution with the solid surface.

2. A method as claimed in claim 1 wherein the composition is obtained by subjecting an aqueous supersaturated solution of either (i) the mineral salt or (ii) a salt isomorphous with the mineral salt to sonic or ultrasonic vibration.

3. A method as claimed in claim 2 wherein the seed crystals have 0.025–0.5 times the diameter of crystals of the same mineral salt which crystallise out from an aqueous supersaturated solution thereof in the absence of sonic or ultrasonic vibration.

4. A method as claimed in claim 2 wherein the frequency of the ultrasonic vibration is between 16 and 40 kHz.

5. A method as claimed in claim 4 wherein the energy density applied to the aqueous supersaturated solution by the ultrasonic vibration is in the range of from 1 to 100 J/cm$^3$.

6. A method as claimed in claim 2 wherein the duration of the applied ultrasonic vibration is 0.05 to 360 seconds.

7. A method as claimed in claim 2 wherein the degree of supersaturation of the aqueous supersaturated solution which is subjected to the ultrasonic vibration is 50 to 400 times over the saturation level.

8. A method as claimed in claim 2 wherein the supersaturated solution which is subjected to the ultrasonic vibration is obtained by passing 2 or more aqueous solutions of the separate components of the mineral salt or of the separate components of the isomorphous salt to a locus of mixing, at which locus the aqueous supersaturated solution is formed and the ultrasonic vibration is applied.

9. A method as claimed in claim 1 wherein the percentage weight of seed crystals from the dispersion to the total weight of seed crystals and depositable mineral salts is in the range 10 to 50% w/w.

10. A method as claimed in claim 1 wherein distribution of the composition into the aqueous precursor liquid is performed 2 to 4 times with the distribution being in series or parallel or a combination of both.

11. A method as claimed in claim 1 wherein the mineral salt is selected from the group consisting of alkaline earth metal carbonates and alkaline earth metal sulphates.

12. A method as claimed in claim 1 wherein the seed crystals are of Mean particle size of 0.5 to 2 microns.

13. A method as claimed in claim 1 wherein the seed crystals are present in the dispersion in an amount of from 1 to 60% by weight based on the total weight of dispersion.

14. A method as claimed in claim 1 wherein the seed crystals are barium sulphate crystals and have 3 dimensional distances of length, breadth and thickness, normal to one another, in a ratio of 0.4–1.5:1:0.4–1.5.

15. A method as claimed in claim 1 wherein the seed crystals have one or more voids therein which voids occupy 5 to 40% of the volume enclosed by the envelope of the outer surface of the seed crystals.

16. A method as claimed in claim 1 wherein the seed crystals are rounded calcium carbonate crystals having a diameter in the range of 1 to 2.5 microns.

17. A method as claimed in claim 1 further comprising the step of monitoring the size of the crystals.

* * * * *